(12) United States Patent
Blair

(10) Patent No.: US 11,092,285 B2
(45) Date of Patent: Aug. 17, 2021

(54) PRESSURIZED GAS CONTAINER AND PROCESS

(71) Applicant: GENESIS IO, LLC, Pompano Beach, FL (US)

(72) Inventor: Andrew Jay Blair, Adel, IA (US)

(73) Assignee: GENESIS IO, LLC, Pompano Beach, FL (US)

(*) Notice: Subject to any disclaimer, the term of this patent is extended or adjusted under 35 U.S.C. 154(b) by 167 days.

(21) Appl. No.: 16/573,982

(22) Filed: Sep. 17, 2019

(65) Prior Publication Data

US 2021/0080060 A1 Mar. 18, 2021

(51) Int. Cl.
*F17C 1/02* (2006.01)
*F17C 1/06* (2006.01)
*B29C 53/56* (2006.01)

(52) U.S. Cl.
CPC ............... *F17C 1/02* (2013.01); *B29C 53/56* (2013.01); *F17C 1/06* (2013.01); *F17C 2201/0147* (2013.01); *F17C 2203/013* (2013.01); *F17C 2203/0607* (2013.01); *F17C 2203/0658* (2013.01); *F17C 2209/2154* (2013.01); *F17C 2209/221* (2013.01); *F17C 2270/0171* (2013.01); *F17C 2270/0189* (2013.01)

(58) Field of Classification Search
CPC ...... F17C 1/02; F17C 1/06; F17C 1/04; B29C 53/56
USPC ............. 220/590, 589, 588, 586, 581; 206/6
See application file for complete search history.

(56) References Cited

U.S. PATENT DOCUMENTS

| | | | | |
|---|---|---|---|---|
| 1,651,521 A | * | 12/1927 | Girardville | ............... F17C 1/06 220/589 |
| 2005/0087537 A1 | * | 4/2005 | Kimbara | ................... F17C 1/14 220/586 |
| 2014/0263358 A1 | * | 9/2014 | Espinosa-Loza | ....... F17C 13/06 220/560.04 |

FOREIGN PATENT DOCUMENTS

| DE | 102007006047 A1 | * | 8/2008 | ................ F17C 1/12 |
| GB | 936198 A | * | 9/1963 | ............. G21C 1/326 |

* cited by examiner

*Primary Examiner* — Robert J Hicks
(74) *Attorney, Agent, or Firm* — Steven C. Stewart

(57) ABSTRACT

A method and apparatus to hold pressurized gas is disclosed. Shell halves having opposing apertures with inserted tubes are combined to create an enclosed pressure vessel. Strands of Kevlar fiber and strands of carbon fiber cover the shell by wrapping the shell through the tubes. Resin coats the wrapped strands and fills the tubes. Pressurized gas is injected and retrieved from the pressure vessel.

17 Claims, 14 Drawing Sheets

150

┌─────────────────────────────────────────────────────────┐
│ Encase an enclosed pressure vessel with a first and second side of a shell, │
│ Extending tubes that extend through the enclosed pressure vessel via opposing │
│ apertures cut out of the shell │
│ Welding the Tubes to the first and second side of the shell │
│ 152 │
└─────────────────────────────────────────────────────────┘
↓
┌─────────────────────────────────────────────────────────┐
│ Wrap the shell with a strands of Kevlar fiber and strands of carbon fiber from a shell │
│ outer perimeter edge, over an outer surface of the first side, through at least one of the │
│ plurality of tubes, over an outer surface of the second side, and around the outer │
│ perimeter edge │
│ 154 │
└─────────────────────────────────────────────────────────┘
↓
┌─────────────────────────────────────────────────────────┐
│ Cover the shell with a resin by coating the strands of Kevlar fiber and the strands of │
│ carbon fiber and by filling with the resin the plurality of tubes │
│ 156 │
└─────────────────────────────────────────────────────────┘
↓
┌─────────────────────────────────────────────────────────┐
│ Coupling a bi-directional pressure valve to the shell through which gas can pass to or │
│ from the enclosed pressure vessel │
│ 158 │
└─────────────────────────────────────────────────────────┘
↓
┌─────────────────────────────────────────────────────────┐
│ Inject a pressurized gas through the pressure valve into the enclosed pressure vessel. │
│ 160 │
└─────────────────────────────────────────────────────────┘

FIG. 1B

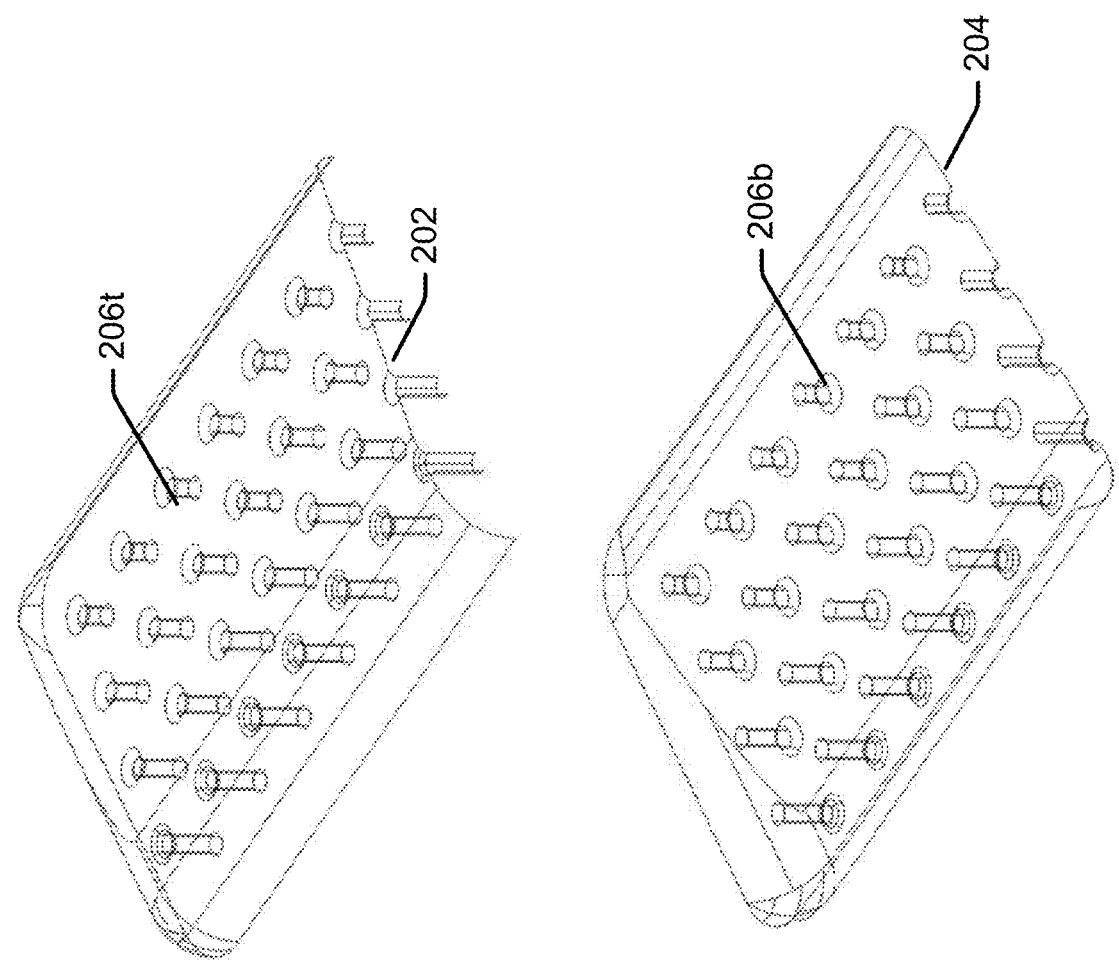

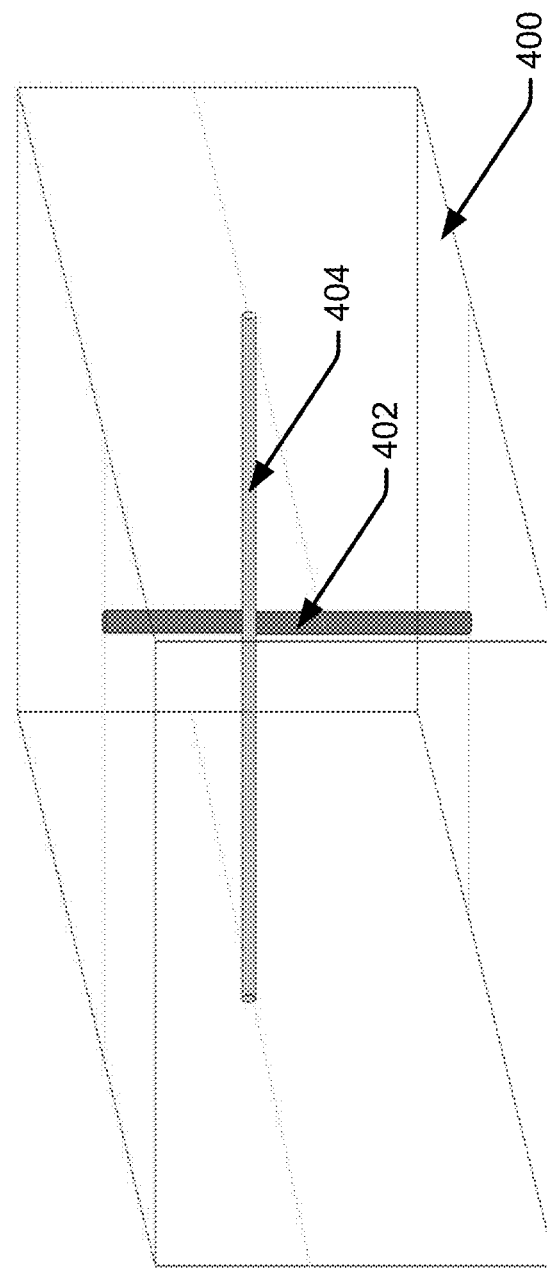

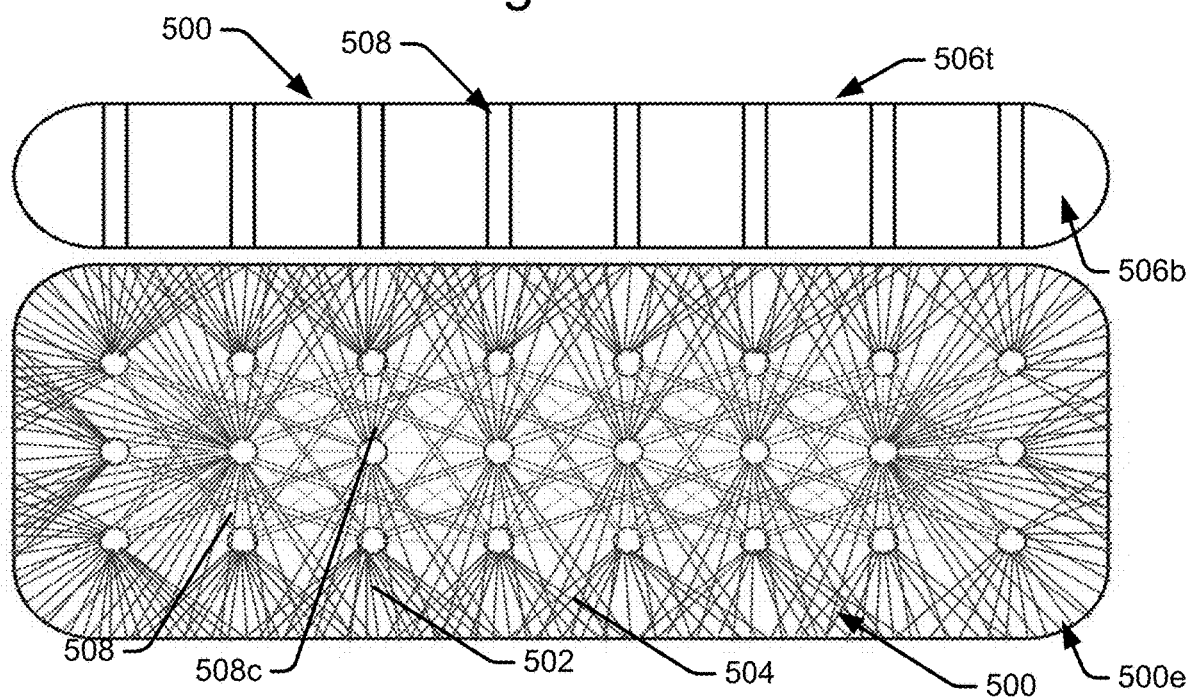

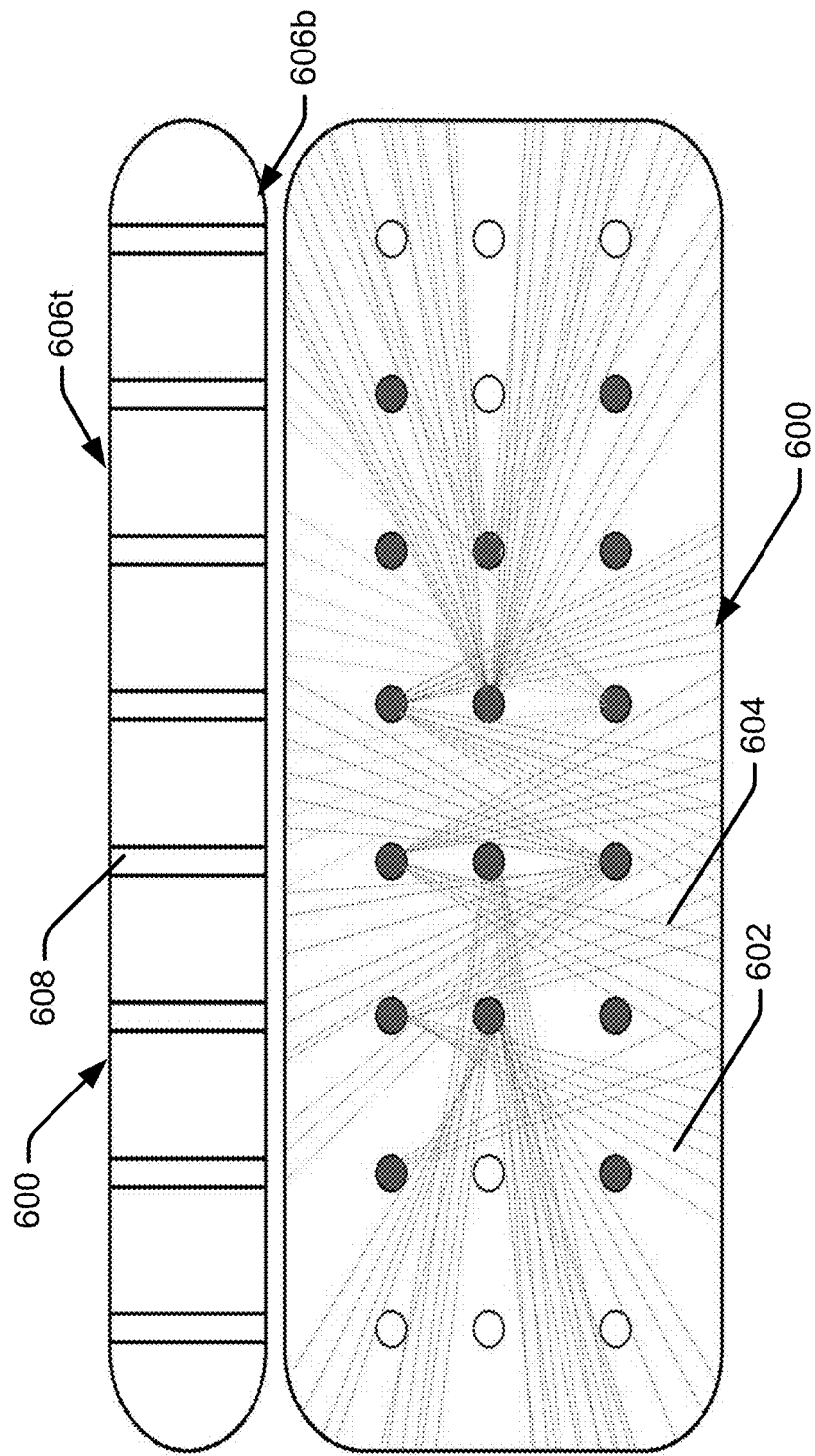

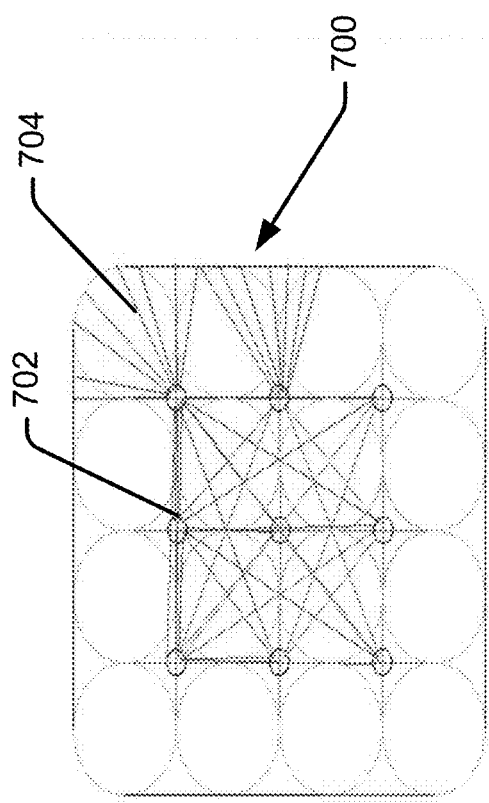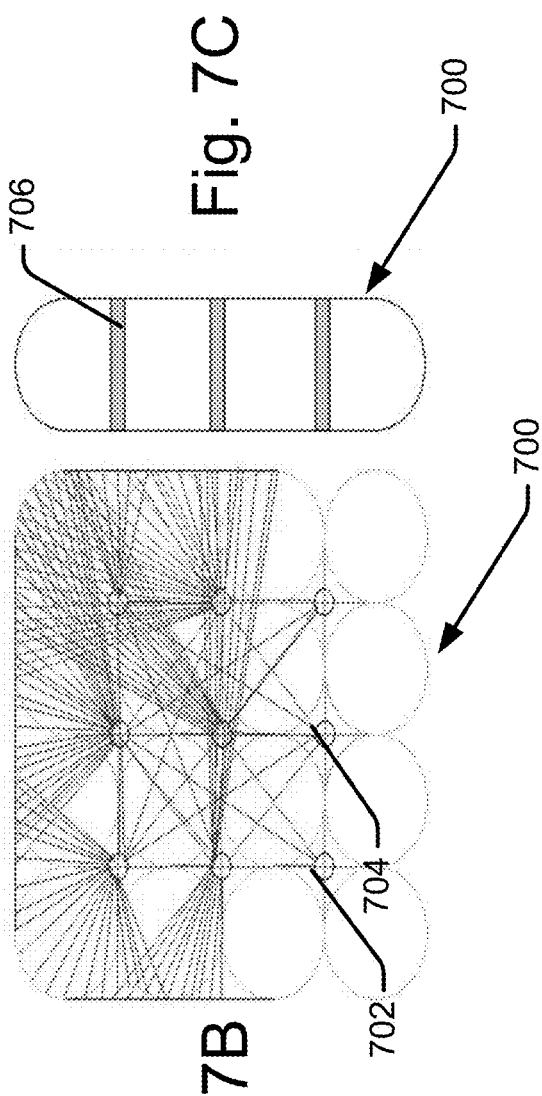

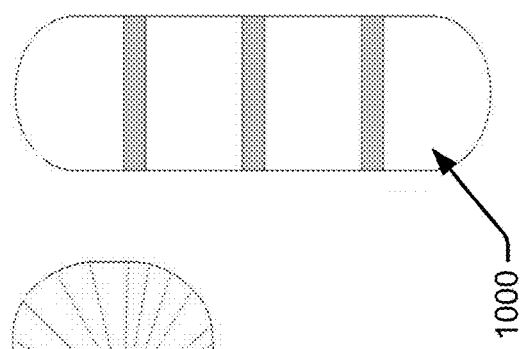
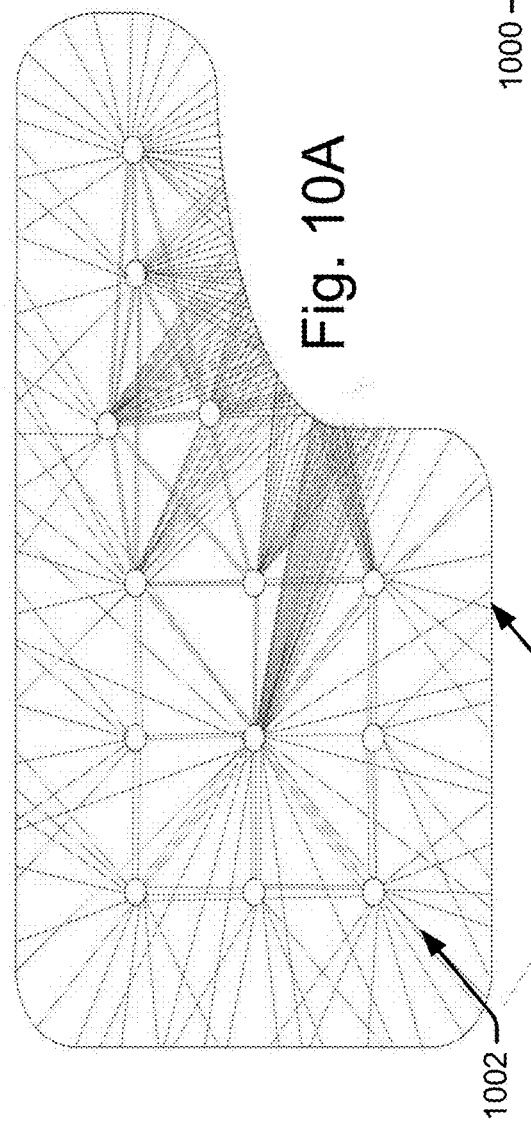
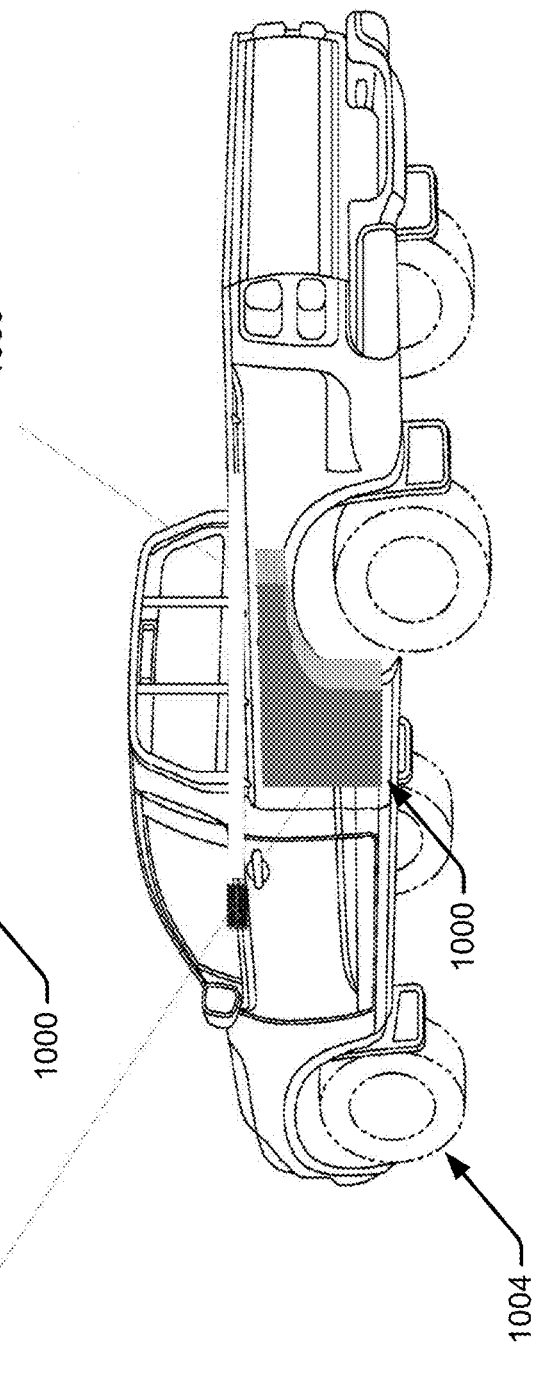

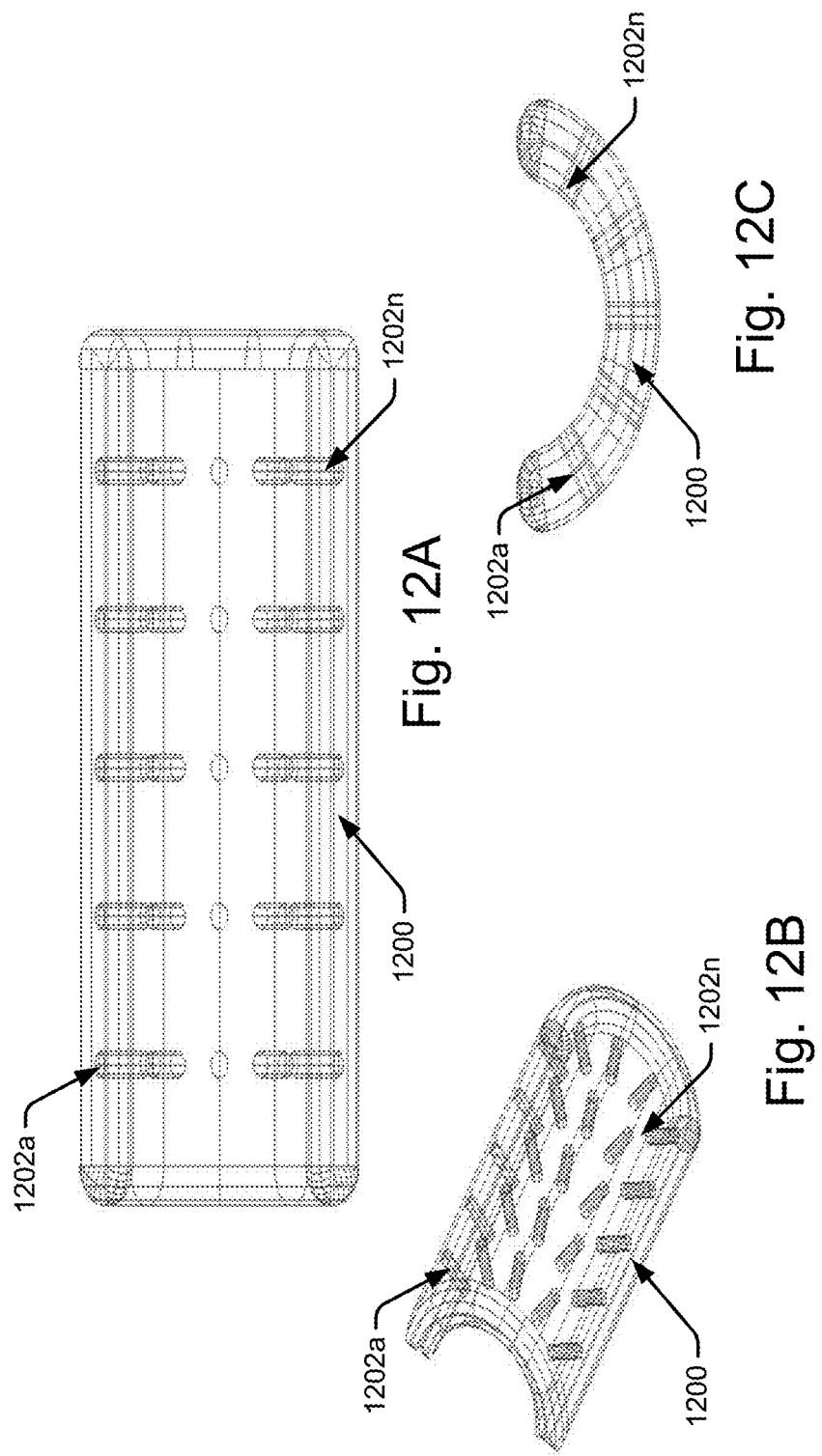

PRESSURIZED GAS CONTAINER AND PROCESS

TECHNICAL FIELD

These claimed embodiments relate to a container for holding pressurized gas and to a method for making a storage device for holding a pressurized gas and/or liquid that can be used to provide fuel.

BACKGROUND OF THE INVENTION

A container to hold and store pressurized gas, and method, is disclosed.

High pressurized storage containers store gas that is used to power vehicles. Storage containers holding high pressurized gasses are typically cylindrical in shape. Cylindrical storage containers add size and weight to the vehicle. Such size and weight make using pressurized gas to power vehicles impractical or uneconomical.

Storage containers are made of steel or other strong metals to enable the container to maintain a high pressure. In order to make these storage containers light weight, the container walls must be thin thereby limiting both the pressure and the capacity of the container. Storage containers that are designed to hold very high-pressure gasses have been wrapped with materials to increase their pressure capacity. But the cylindrical shape of the container has limited their use. Further when the entire cylindrical container is wrapped, the containers tend to blow out at high pressure.

SUMMARY OF THE INVENTION

In one implementation a container is disclosed that holds pressurized gas. The container includes a shell with a first surface on a first side of the shell and a second surface on an opposing side of the shell. The shell having an outer perimeter edge. The first side of the shell forms an enclosed pressure vessel with the second side of the shell. The first side of the shell and the second side of the shell form opposing apertures for receiving tubes. The tubes extend through the pressure vessel via at least one of the apertures on the first side and integrally connect with first side and extend through at least one of the apertures on the second side and integrally connect with the second side. Strands of Kevlar fiber and strands of carbon fiber cover the shell (preferably the entirety of the shell) by wrapping the strands from the outer perimeter edge over an outer surface of the first side through one of the tubes over an outer surface of the second side and around the outer perimeter edge. Resin covers the shell, by coating the strands of Kevlar fiber and carbon fiber and fills the tubes.

In another implementation, a method for storing pressurized gas is disclosed that includes forming a container to hold the pressurized gas. The container is formed by providing a first side of the shell and a second side of a shell encasing an enclosed pressure vessel with opposing apertures cut out of the first and second side of the shell. The edges of the opposing apertures in the first side and the second side on the shell are coupled to a tube that is inserted in and extends through the enclosed pressure vessel. The shell is wrapped with Kevlar fiber and strands of carbon fiber from the outer perimeter edge, over an outer surface of the first side, through one of the plurality of tubes, over an outer surface of the second side, and around the outer perimeter edge. Resin coats the strands of Kevlar fiber and carbon fiber fills the tubes. A bi-directional pressure valve is coupled to the shell through which gas can pass to or from the pressure vessel. A pressurized gas is injected through the pressure valve into the enclosed pressure vessel.

In a further implementation, a method for forming a container to hold pressurized gas includes providing a first side of the shell and a second side of the shell. Apertures are formed in the first side of the shell and in the second side of the shell. The apertures in the first side and in the second side receive at least one tube of many tubes. The first side of the shell is coupled with the second side of the shell to create an enclosed pressure vessel. The tubes are coupled to the shell sides by inserting the tubes through the pressure vessel via at least one of the apertures on the first side and integrally connecting the tube with the first side, and inserting the tube through one of the apertures on the second side and integrally connecting the tube with the second side. The shell is covered by wrapping strands of Kevlar fiber and strands of carbon fiber from an outer perimeter edge of the shell, over an outer surface of the first side, through the tube, over an outer surface of the second side, and around the outer perimeter edge. The shell is covered by coating the strands of wrapped Kevlar fiber and carbon fiber with resin and filling the tubes with the resin.

BRIEF DESCRIPTION OF THE DRAWINGS

The detailed description is described with reference to the accompanying figures. In the figures, the left-most digit(s) of a reference number identifies the figure in which the reference number first appears. The use of the same reference number in different figures indicates similar or identical items.

FIG. 1B is a flow chart of a method for storing pressurized gas;

FIG. 2A is a side perspective view of a top shell and a bottom shell with apertures;

FIG. 4 is a perspective view of an exemplary container in which tubes are inserted;

FIG. 5 is a top perspective view of a container illustrating an exemplary weaving pattern of the Kevlar strands and carbon fiber strands;

FIGS. 6A-6B are a side and top perspective views respectively of an alternate embodiment of a container illustrating an exemplary weaving pattern of the Kevlar strands and carbon fiber strands;

FIGS. 7A, 7B and 7C are top and a side perspective views of an alternate embodiment of a container shown in FIG. 4 illustrating an exemplary weaving pattern of the Kevlar strands and carbon fiber strands;

FIG. 10A is a top perspective view of an alternate embodiment of a container illustrating an exemplary weaving pattern of the Kevlar strands and carbon fiber strands;

FIG. 10B is a top perspective view of an alternate embodiment of a container;

FIG. 10C is a side perspective view of an alternate embodiment of a container shown in FIG. 10C embedded in a pickup truck;

FIG. 12A-12C are a perspective view of an alternated embodiment of a concave wide body container with tubes are inserted.

DETAILED DESCRIPTION

Figure 1A:
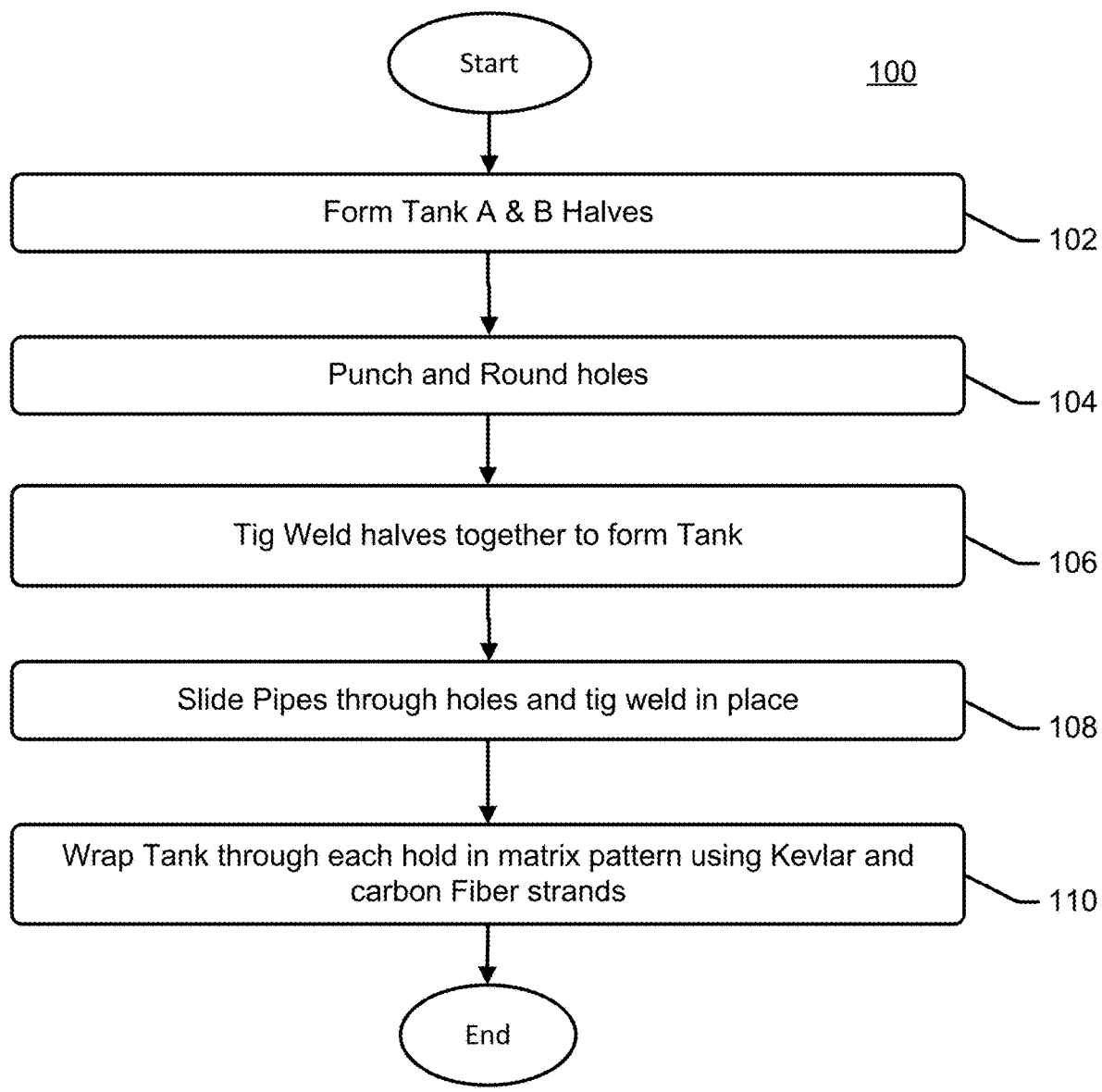
FIG. 1A is a flow chart of a method for forming a container to hold pressurized gas.

Illustrated in FIGS. 1A-1B are process 100 and process 150 for forming a container to hold pressurized gas and for storing pressurized gas. More particularly processes 100 and 150 describe a method for implementing high pressure conforming tank technology or describe a high-pressure gaseous storage container that is not cylindrical and can be formed into any overall shape. The exemplary processes in FIG. 1A-1B are illustrated as a collection of blocks in a logical flow diagram. The order in which the operations are described is not intended to be construed as a limitation, and any number of the described blocks can be combined in any order and/or in parallel to implement the process. For discussion purposes, the processes are described with reference to FIG. 2-12, although they may be implemented in other system architectures.

Referring to FIG. 1A there is shown a flow chart of process 100 for forming a non-cylindrical container to hold pressurized gas.

In block 102, Shell A and B halves (referred to herein as "top shell and bottom shell" halves) are formed in a shape of a container to fit an application (details shown herein in FIG. 2A). A punch press (or a drill) may be used in block 104 to punch holes (or apertures) through the shell halves in a grid matrix pattern. The holes (apertures) are rounded off (which is honed out at ends so when the shell is wrapped with fiber, the shell halves will have no sharp edge and their corners are preferably rounded off when welded) so that a tube or pipe can be inserted into each of the apertures.

Figure 2B:
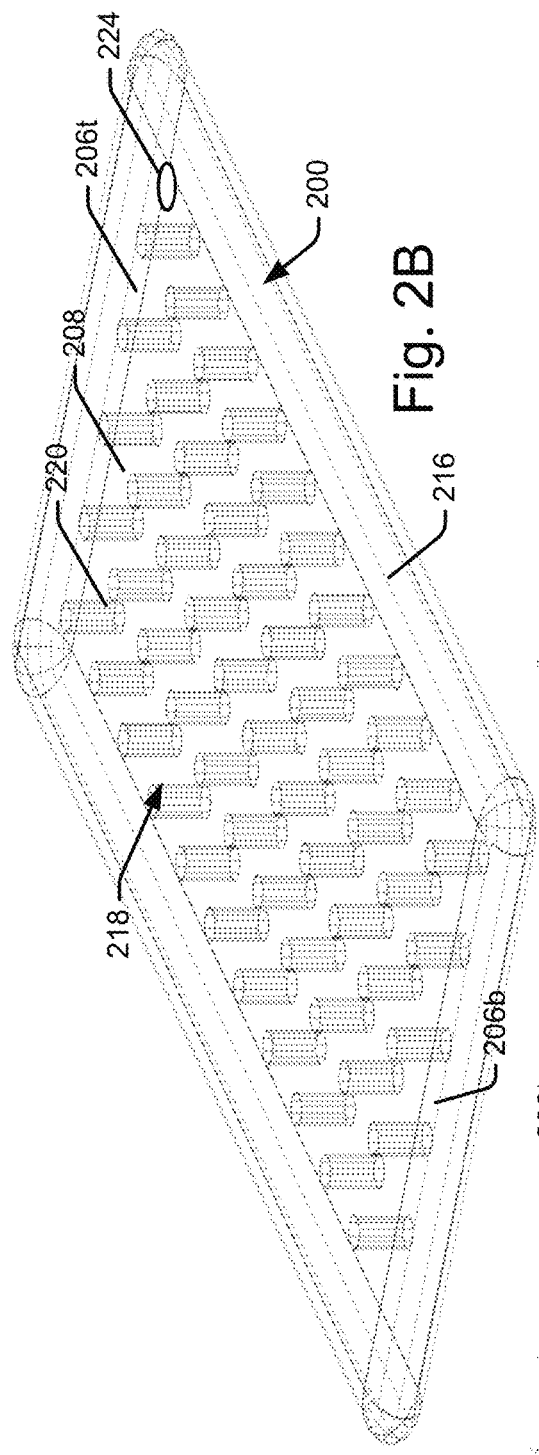
FIG. 2B is a top side perspective view of a Flat tank for storing pressurized gas.

In block 106, the top shell and bottom shell halves are tig welded together to form a container having an enclosed pressure vessel (See FIG. 2B).

In block 108, after welding together halves of the shell, pipes or tubes are slid through the apertures and tig welded into place to the shell around edges of the apertures to ensure no leaks between the tubes and the half. The tig weld preferably begins with a deep bead at the joint itself and a few more arcing beads to strengthen the joint. The tubes are welded into place where the throat (valve) would be placed. Any burrs occurring during the welding process are preferably grinded to prevent snagging when wrapping the shell with the fiber strands.

Referring to block 110, cylinders/tubes are wrapped in Kevlar fiber and/or carbon fiber strands and crisscross each other to form a high retention strength. The Kevlar fiber and/or carbon fiber strands are wrapped to pass through the aluminum tubes that were welded into place.

Wrapping the tubes would be similar to wrapping a donut inside out around the circumference. Each aperture with a tube welded into place is the center of the donut. Crisscrossing these wrappings in a grid matrix pattern, overlapping each other, and surrounding pipes, in a grid pattern to cover substantially every region and ensuring the critical areas of the surface of the shell are covered. A large tank is preferably wrapped with an automated system by passing the strands back and forth in a weave. Each circular pattern through a tube could be wrapped with a single strand. Thus, in an exemplary automated process, multiple sections of the surface of the container could be wrapped simultaneously.

Referring to FIG. 1B there is shown a flow chart of process 150 for forming a container to hold pressurized gas.

In block 152, a container to hold the pressurized gas is formed with a first side of the shell and a second side of a shell. The shell encases an enclosed pressure vessel with opposing apertures cut out of the first and second side of the shell. The opposing apertures in the first side and the second side are coupled to at least one of a plurality of tubes that extend through the enclosed pressure vessel.

In block 154, the shell is wrapped with strands of Kevlar fiber and strands of carbon fiber from an outer perimeter edge, over an outer surface of the first side, through the at least one of the tubes, over an outer surface of the second side, and around the outer perimeter edge. In one implementation, the other tubes in the shell are similarly wrapped. By wrapping in this manner, a pressure of a gas contained within the enclosed pressure vessel can exceed a number of a tensile strength of one of the stands of Kevlar fiber and/or carbon cubed. In a preferred implementation, the strands of Kevlar fiber and/or the strands of carbon fiber are wrapped around the shell through the tubes and cover the entire surface of the top shell and the bottom shell.

In block 156, the shell is covered with a resin by coating the strands of Kevlar fiber and the strands of carbon fiber and by filling with the resin the plurality of tubes.

In block 158, a bi-directional pressure valve is coupled to the shell through which gas can be injected to pass to or be retrieved from the enclosed pressure vessel. During use of the container, the pressurized gas injected into the enclosed pressure vessel can be retrieved via the bi-directional pressure valve, and the retrieved pressurized gas can be fed to a motor or an engine to power a vehicle.

In block 160, a pressurized gas is injected through the pressure valve into the enclosed pressure vessel.

Referring to FIG. 2A there is shown a side perspective view of a top shell 202 and a bottom shell 204 with top aperture 206$t$ and bottom aperture 206$b$ cutout of the shells 202 and 204 respectively. In one implementation the top shell 202 and/or the bottom shell 204 has a flat surface. In one implementation, flat may mean that the surface lies in a single plane.

Figure 2C:
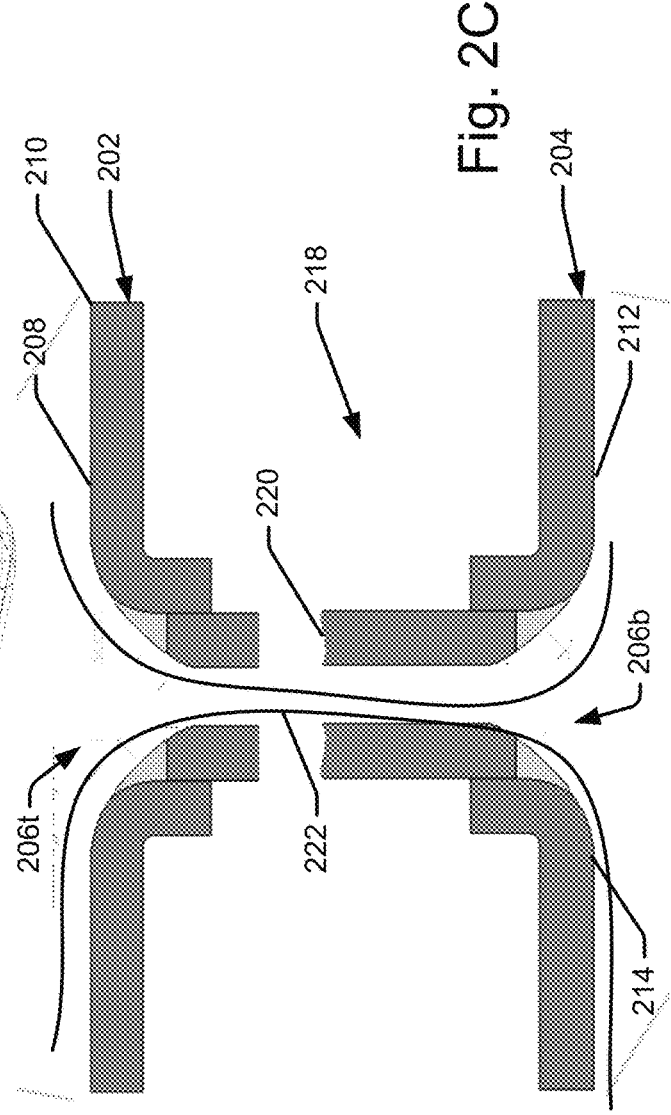
FIG. 2C is a side cutaway view of the tubes inserted into one of the apertures of the flat tank.

Referring to FIG. 2B-2C, there is shown a top side perspective view of a flat tank or container 200 for storing pressurized gas. Container 200 (also referred to a tank) is formed from shell 202 and shell 204. Container 200 includes a surface 208 on side 210 and shell 204 includes a surface 212 on an opposing side 214. Shell 202 and shell 204 have an outer perimeter edge 216.

Referring to FIGS. 2B and 2C, top shell 202 is joined with the bottom shell 204 to enclose pressure vessel 218. Stamped out of the top shell 202 are apertures 206$t$ and stamped out of the bottom shell 204 are opposing apertures 206$b$ for receiving the tubes 220.

In one implementation a bi-directional pressure valve 224 is integrally connected to the top shell 202 through which gas can pass to or from the enclosed pressure vessel. The bi-directional pressure valve 224 may be welded to the top shell using known welding techniques.

Figure 3:
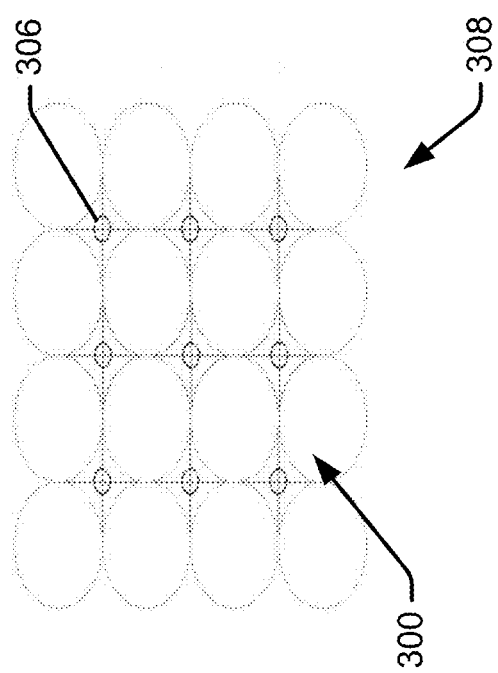
FIG. 3 is a top view of an exemplary grid pattern of apertures cut into one of the shells of the container.
Figure 8:
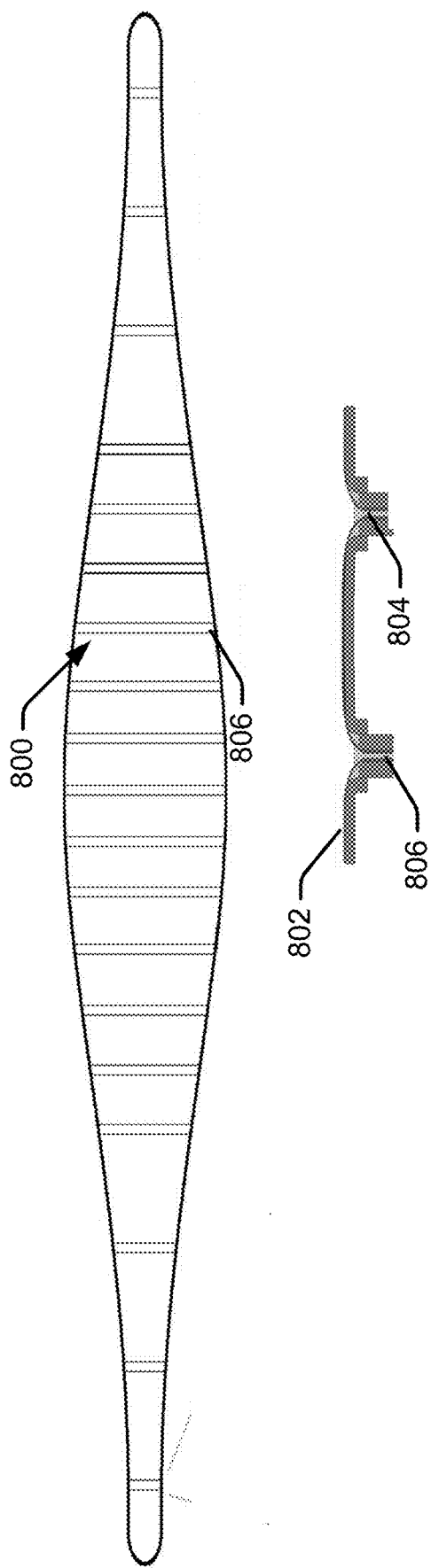
FIG. 8 is a side planer view of a wing embodiment of a container illustrating an exemplary weaving pattern of the Kevlar strands and carbon fiber strands.

Referring to FIG. 3, there is shown is a top view of an exemplary grid pattern 300 of apertures 306 cut into one of the shells of a container (e.g. container 200 in FIG. 2B).

Apertures 306 (Aperture 206t and aperture 206b of FIG. 2A-2C) may be stamped out of the top shell and bottom shell in a matrix pattern 308.

Referring to FIG. 2C, tube 220 extends through the enclosed pressure vessel 218 via at least one of the apertures 206t of the top shell 202. Tube 220 is integrally connected to top shell 202 and extends through at least one of the bottom apertures 206b and is integrally connecting thereto. Carbon fiber strands and/or Kevlar strands 222 are strung through tube 220 as described herein.

Referring to FIG. 4, there is shown a large cubed container 400. In one implementation one of many vertical tubes 402 and one of many horizontal tubes 404 are placed next to each other within the container 400 and do not overlap.

Referring to FIG. 5A-5B, there is shown a side and top perspective view of a large flat container 500 respectively illustrating an exemplary weaving pattern of the Kevlar fiber strands 502 and carbon fiber strands 504. Strands 502 and strands 504 extend around top shell 506t and bottom shell 506b that form container 500. Kevlar fiber strands 502 and/or carbon fiber strands 504 cover top shell 506t and bottom shell 506b by wrapping from an outer perimeter edge 500e of container 500 over an outer surface of the top shell 506t through at least one of the tubes 508 over an outer surface of the bottom shell 506b and around the outer perimeter edge 500e of container 500. In one implementation, strands 504 are 0.283 w carbon fiber strands. In one implementation the ratio of Kevlar strands to carbon fiber strands is 1:1.

In one implementation, in a first layer strands are strung from the center apertures 508c out, in a second layer strands are strung through apertures along a perimeter, in a third layer strands crisscross every aperture length wise, in a forth layer strands crisscross every other aperture, and in a 5$^{th}$ layer a strand pulls the other strands in place and both boxes and crisscrosses each other.

After the weaving process, resin (not shown) fills the tubes and coats the strands of Kevlar fiber and the strands of carbon fiber. The resin may cover the shell by coating the strands of Kevlar fiber and the strands of carbon fiber, and by filling the tubes to form the container with resulting in the side of the container having a flat surface.

Referring to FIG. 6A-6B, there is shown a side and top perspective view respectively of an alternate embodiment of a container 600 illustrating an exemplary weaving pattern of the Kevlar strands 602 and carbon fiber strands 604. Kevlar strands 602 and carbon fiber strands 604 are weaved around top shell 606t and bottom shell 606b and through tubes 608 that form container 600. In one implementation additional layers of strands are wrapped in a pattern that spread out a load caused by pressurized gas in the container 600.

Referring to FIGS. 7A-7C, there is shown a top and side perspective view of an alternate embodiment of a container 700 shown in FIG. 4. Container 700 illustrates an exemplary weaving pattern of the Kevlar strands 702 and carbon fiber strands 704 via tubes 706.

The weaving methodology includes first weaving the long strands with the furthest distance first to around the perimeter of the container. Once weaved and provided full coverage in every direction, the inner strands are weaved, resulting in the outer strands being pulled down and being overlapped, and resulting in stronger bonds between the woven strands and the container bonding.

Ultimately after the surface of the structure is weaved, the final strands will be the individual boxes and cross over in an X pattern. This weaving process may require for example 50 strands overlapping around the perimeter; however, there could end up being one hundred and fifty strands through the aperture and through the enclosed pressure vessel, resulting in the main body of the container being many times stronger (15,000+ Pounds per square inch) than a cylinder tank. The quantity of strands enables stronger storage container/tanks being built to any geometry, so long as there are no right angles along the edges of the containers.

Referring to FIGS. 8A-8B, there is shown a side planer views of a wing embodiment of a container 800 enclosing a pressure vessel to hold pressurized gas. FIGS. 8A-8B also illustrate an exemplary weaving pattern of the Kevlar strands and carbon fiber strands 802 on an airplane wing. Resin 804 is shown filling tube 806 once the strands 802 have wrapped container 800 via tube 806.

Figure 9:
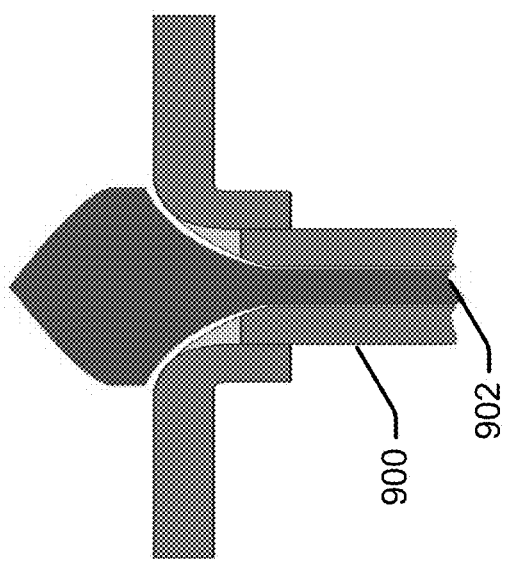
FIG. 9 is a side cutaway view of the tubes inserted into one of the apertures illustrating another exemplary weaving pattern.

Referring to FIG. 9, there is shown a side cutaway view of one of the tubes 900 inserted into one of the apertures 902 illustrating another exemplary weaving pattern. If during the fabrication process, it is desired to run a wrap the strands around the complete vessel before a cap is be inserted into the apertures so that the wrap of the strands will not cover the gap. Additionally, the weaves/strands may be wrapped in a crisscross pattern on the grid to pull the wrap down and finish off a fabrication of the container.

Referring to FIG. 10A, there is shown is a top perspective view of an alternate embodiment of a container 1000 illustrating an exemplary weaving pattern of the Kevlar strands and carbon fiber strands 1002.

Referring to FIG. 10B, there is shown a side perspective view of the alternate embodiment of a container 1000 shown in FIG. 10A for embedding in a pickup truck.

Referring to FIG. 10C, there is shown a top perspective view of the alternate embodiment of a container 1000 shown in FIG. 10A embedded in a pickup truck 1004.

Figure 11:
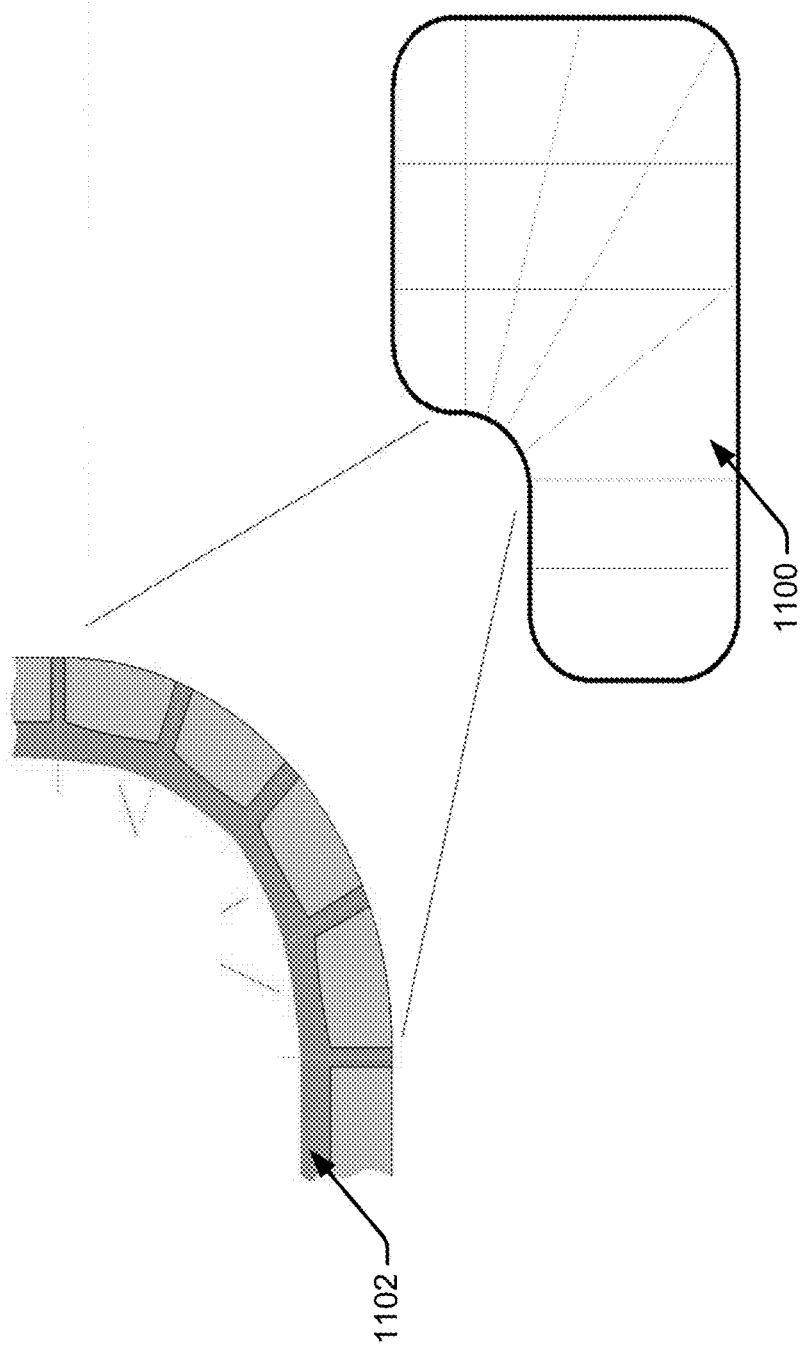
FIG. 11 is a side perspective view of an alternate embodiment of a container shown in FIG. 10A embedded in a pickup truck illustrating an exemplary filling of weaving of the Kevlar strands and carbon fiber strands.

Referring to FIG. 11, there is shown a side perspective view of an alternate embodiment of a container 1100 shown in FIG. 10A embedded in a pickup truck illustrating an exemplary filling of weaving of the Kevlar strands and carbon fiber strands 1102.

Referring to FIGS. 12A-12B, there is shown a top and side perspective view, and FIG. 12B there is shown an elevated view of an alternated embodiment of a concave wide body container 1200 with tubes 1202a-1202n are inserted therein. Container 1200 is wrapped with Kevlar strands and fiber strands using the process described in connection with FIG. 1.

While the above detailed description has shown, described and identified several novel features of the invention as applied to a preferred embodiment, it will be understood that various omissions, substitutions and changes in the form and details of the described embodiments may be made by those skilled in the art without departing from the spirit of the invention. Accordingly, the scope of the invention should not be limited to the foregoing discussion but should be defined by the appended claims.

What is claimed is:

1. A container to hold pressurized gas comprising:
   a shell with a first surface on a first side of the shell and a second surface on an opposing side of the shell, the shell having an outer perimeter edge;
   a plurality of tubes to couple with the shell;
   the first side of the shell forming an enclosed pressure vessel with the opposing side of the shell;
   the first side of the shell and the opposing side of the shell forming a plurality of apertures to receive at least one of the plurality of tubes;
   the at least one of the plurality of tubes a) inserted through the enclosed pressure vessel via at least one of the plurality of apertures on the first side and integrally connecting with the first side of the shell, and b) inserted through at least one of the plurality of apertures on the opposing side and integrally connecting with the opposing side of the shell;

a plurality of strands of Kevlar fiber and a plurality of strands of carbon fiber covering the shell by wrapping from the outer perimeter edge over an outer surface of the first side through the at least one of the plurality of tubes over an outer surface of the opposing side and around the outer perimeter edge; and resin filling the plurality of tubes and coating the plurality of strands of Kevlar fiber and the plurality of strands of carbon fiber.

2. The container as recited in claim 1, wherein the plurality of strands of Kevlar fiber and the plurality of strands of carbon fiber wrap around the shell via at least one of the plurality of tubes and cover an entirety of the first surface and the second surface of the shell.

3. The container as recited in claim 1 further comprising:
a second one of the plurality of tubes a) inserted through the enclosed pressure vessel via at least one of the plurality of apertures on the first side and integrally connecting with the first side of the shell, and b) inserted through at least one of the plurality of apertures on the opposing side and integrally connected with the opposing side, and a second plurality of strands of Kevlar fiber and a second plurality of strands of carbon fiber covering the shell by wrapping from the outer perimeter edge over an outer surface of the first side through the second one of the plurality of tubes over the outer surface of the opposing side and around the outer perimeter edge.

4. The container as recited in claim 1, wherein the plurality of strands of carbon fiber cover the shell by wrapping from the outer perimeter edge over the outer surface of the first side through the at least one of the plurality of tubes over the outer surface of the opposing side and around the outer perimeter edge to enable a pressure of a gas contained within the enclosed pressure vessel to exceed a number of a tensile strength of one of the plurality of stands of Kevlar fiber or a tensile strength of one of the plurality of stands of carbon cubed.

5. The container as recited in claim 1, wherein the resin covers the shell by coating the plurality of strands of Kevlar fiber and the plurality of strands of carbon fiber, and by filling the plurality of tubes to form the container with the first side having a flat surface.

6. The container as recited in claim 1, wherein the first side of the shell forming the enclosed pressure vessel with the opposing side of the shell in a shape of a wing.

7. The container as recited in claim 1 further comprising a bi-directional pressure valve integrally connected to the shell through which gas can pass to or from the enclosed pressure vessel.

8. A method for storing a pressurized gas comprising:
forming a container to hold the pressurized gas comprising:
a) providing a first side of a shell and a second side of the shell encasing an enclosed pressure vessel with a plurality of opposing apertures cut out of the first and second side of the shell, edges of the plurality of opposing apertures cut out of the first side and the second side coupled to at least one of a plurality of tubes that extend through the enclosed pressure vessel, the shell having an outer perimeter edge;

b) wrapping the shell with a plurality of strands of Kevlar fiber and a plurality of strands of carbon fiber from the outer perimeter edge, over an outer surface of the first side, through the at least one of the plurality of tubes, over an outer surface of the second side, and around the outer perimeter edge;

c) covering the shell with a resin by coating the plurality of strands of Kevlar fiber and the plurality of strands of carbon fiber and by filling with the resin the plurality of tubes;

d) coupling a bi-directional pressure valve to the shell through which gas can pass to or from the enclosed pressure vessel; and injecting the pressurized gas through the bi-directional pressure valve into the enclosed pressure vessel.

9. The method as recited in claim 8 further comprising:
wrapping the plurality of strands of Kevlar fiber and the plurality of strands of carbon fiber around the shell through the at least one of the plurality of tubes to cover an entire surface of the shell.

10. The method as recited in claim 8 further comprising:
inserting a second one of the plurality of tubes through the enclosed pressure vessel via at least one of the plurality of opposing apertures on the first side;
integrally connecting the second one of the plurality of tubes with the first side;
inserting the second one of the plurality of tubes through at least one of the plurality of opposing apertures on the second side;
integrally connecting the second one of the plurality of tubes with the second side; and
covering with a second plurality of strands of Kevlar fiber and a second plurality of strands of carbon fiber the shell by wrapping from the outer perimeter edge over an outer surface of the first side through the second one of the plurality of tubes over an outer surface of the second side and back around the outer perimeter edge.

11. The method as recited in claim 8 further comprising retrieving the pressurized gas injected into the enclosed pressure vessel via the bi-directional pressure valve, and feeding the retrieved pressurized gas to a motor or an engine to power a vehicle.

12. A method for forming a container to hold pressurized gas comprising:
providing a first side of a shell and a second side of the shell;
forming a plurality of apertures in the first side of the shell and in the second side of the shell, at least one of the plurality of apertures in the first side and at least one of the plurality of apertures in the second side to receive at least one of a plurality of tubes;
coupling the first side of the shell with the second side of the shell to create an enclosed pressure vessel, the shell having an outer perimeter edge;
coupling the plurality of tubes to the shell by inserting the at least one of the plurality of tubes through the enclosed pressure vessel via at least one of the plurality of apertures on the first side and integrally connecting the at least one of the plurality of tubes with the first side, and inserting the at least one of the plurality of tubes through at least one of the plurality of apertures on the second side and integrally connecting the at least one of the plurality of tubes with the second side;
covering the shell by wrapping a plurality of strands of Kevlar fiber and a plurality of strands of carbon fiber from the outer perimeter edge, over an outer surface of the first side, through the at least one of the plurality of tubes, over an outer surface of the second side, and around the outer perimeter edge; and covering the shell by coating the plurality of strands of Kevlar fiber and carbon fiber with resin and filling the plurality of tubes with the resin.

13. The method as recited in claim 12 further comprising coupling the first side of the shell with the second side of the shell to form the container with the first side having a flat surface.

14. The method as recited in claim 12 further comprising coupling the first side of the shell with the second side of the shell to form the container in a shape of a wing.

15. The method as recited in claim 12 further comprising:
   integrally coupling a bi-directional pressure valve to the shell through which gas can pass to or from the enclosed pressure vessel.

16. The method as recited in claim 12 further comprising:
   inserting a second one of the plurality of tubes through the enclosed pressure vessel via at least one of the plurality of apertures on the first side;
   integrally connecting the second one of the plurality of tubes with the first side;
   inserting the second one of the plurality of tubes through at least one of the plurality of apertures on the second side;
   integrally connecting the second one of the plurality of tubes with the second side; and
   covering the shell with a second plurality of strands of Kevlar fiber and a second plurality of strands of carbon fiber by wrapping from the outer perimeter edge over an outer surface of the first side through the second one of the plurality of tubes over an outer surface of the second side and around the outer perimeter edge.

17. The method as recited in claim 16 further comprising:
   wrapping the second plurality of strands of carbon fiber and the plurality of strands of Kevlar fiber around the shell through at least one of the plurality of tubes to cover an entire surface of the shell.

\* \* \* \* \*